United States Patent [19]

Tesch et al.

[11] 4,424,248

[45] Jan. 3, 1984

[54] AREAL FLAT STRATIFIED BODY FOR TREATING GASES OR LIQUIDS, METHOD FOR THE MANUFACTURE THEREOF AND USE OF SUCH STRATIFIED BODY

[75] Inventors: Günter H. Tesch, Fribourg; Johannes J. V. Colijn, Thörishaus, both of Switzerland

[73] Assignee: Breveteam S.A., Zug, Switzerland

[21] Appl. No.: 276,169

[22] Filed: Jun. 22, 1981

Related U.S. Application Data

[63] Continuation of Ser. No. 969,296, Dec. 14, 1978, abandoned.

[30] Foreign Application Priority Data

Dec. 24, 1977 [CH] Switzerland ............... 15944/77
Nov. 23, 1978 [CH] Switzerland ............... 12022/78

[51] Int. Cl.³ ............................................. B32B 5/06
[52] U.S. Cl. ........................................ 428/172; 428/35; 428/72; 428/166; 428/234; 428/237; 428/240; 428/241; 428/243; 428/244; 428/281; 428/283; 428/286; 428/287; 428/300
[58] Field of Search ............. 428/234, 237, 240, 241, 428/243, 244, 281, 283, 286, 287, 300, 35, 72, 166, 172

[56] References Cited

U.S. PATENT DOCUMENTS

| 4,103,062 | 7/1979 | Aberson ............... 428/283 |
| 4,144,368 | 3/1979 | Kim ..................... 428/284 |
| 4,145,464 | 3/1979 | McConnell ............ 428/283 |

FOREIGN PATENT DOCUMENTS 496462 11/1970 Switzerland .

Primary Examiner—Marion McCamish
Attorney, Agent, or Firm—Werner W. Kleeman

[57] ABSTRACT

Fine grain or fibrous solid active particles are immobilized in an areal or flat, flexible stratified body. The active particles serve for treating a liquid or gaseous medium circulating between the stratified body and the surroundings. The treatment, among other things, encompasses the sorption of substances, if desired, followed by desorption for regenerating the active particles, the emission of substances, the ion exchange and the catalysts of chemical reactions. The active substances or particles are enclosed between a base or substratum layer and a fiber-containing cover layer. Both layers are held together by means of holding fibers which are densely distributed over the entire surface and simultaneously anchored in both layers, whereby at the same time there are also immobilized the active particles. According to a preferred method the holding fibers are removed from the cover layer by fiber-orienting needles.

6 Claims, 5 Drawing Figures

AREAL FLAT STRATIFIED BODY FOR TREATING GASES OR LIQUIDS, METHOD FOR THE MANUFACTURE THEREOF AND USE OF SUCH STRATIFIED BODY

CROSS REFERENCE TO RELATED APPLICATION

This is a continuation application of our commonly assigned, copending U.S. application Ser. No. 969,296, filed Dec. 14, 1978, now abandoned.

BACKGROUND OF THE INVENTION

The present invention relates to a new and improved areal or flat (sometimes referred to as surface-like), flexible stratified body for treating a liquid or gaseous medium which is brought into contact therewith, and furthermore, relates to a novel method of fabricating such stratified body and the use thereof.

The flat, flexible stratified body of the invention is of the type comprising a base or substratum layer and a fiber-containing cover or top layer which is pervious for the medium, a granular or fibrous material being dispositioned between the substratum layer and the cover layer, these two layers being interconnected by fiber material at locations distributed over the surface of the stratified body.

With a prior art construction of stratified body of the previously mentioned type, for instance as disclosed in British Pat. No. 1,446,893 and its equivalent German Pat. No. 2,344,835, the substratum layer and the top layer are interconnected by sewing, in order to also thereby be able to utilize filler materials of smaller size without having to secure the same directly at a carrier layer, for instance by adhesive bonding. To this end the substratum layer, a layer formed of granular or fibrous material and the cover layer which contains fibers and is pervious to the medium are superimposed. The substratum layer and the top or cover layer are interconnected at locations distributed over the entire surface of the stratified body by means of the fiber material of the sewing thread or yarn. The material to be brought into sheet shape must, however, have a fiber structure of sufficient length so that it can be twisted together by needles when it is led through a needling machine. However, the sewing thread forms both at the outside and also at the interior of the stratified layer an additional part of the material thereof by virtue of which there is imparted to the stratified body an irregular structure. The stratified body and therefore also the filler material are particularly strongly pressed together along the rows of sewing thread. Moreover, at the sewn locations there is present, if at all, only very little filler material, and therefore, there exists an irregular distribution thereof. Hence, when utilizing the stratified body, for instance as a filter, there is not only hindered a throughflow of the gaseous or liquid medium and also a uniform access of the medium to all parts of the enclosed material, but furthermore, the stratified body possesses varying permeability, so that there prevails an irregular throughflow. Additionally, the stitching or sewing operation is technically complicated and requires the use of an additional material, which, for instance, must be coordinated to the relevant use of the stratified body as a filter.

SUMMARY OF THE INVENTION

Therefore, with the foregoing in mind it is a primary object of the present invention to provide a new and improved construction of areal or flat, flexible stratified body for treating gases or liquids and a method of manufacturing the same, in a manner not associated with the aforementioned drawbacks and limitations of the prior art proposals.

Another and more specific object of the present invention aims at the provision of a new and improved stratified body of the previously mentioned type and a method of manufacturing the same, without having to tolerate the drawbacks of the state-of-the-art stratified bodies, and wherein there can be realized a purely mechanical immobilizing of a granular or fibrous material and at the same time also desired bendability or flexibility of the stratified body, and which stratified body impairs as little as possible any interaction between the medium to be treated and the enclosed material and thus can be employed for different types of treatment of a gaseous or liquid medium.

Now in order to implement these and still further objects of the invention, which will become more readily apparent as the description proceeds, the stratified body of the previously mentioned type is manifested by the features that fine grain or fibrous solid active substances or particles are enclosed between the substratum layer and the top or cover layer. Furthermore, both in the substratum layer which essentially holds back the active substances or particles and in the cover layer, there are anchored holding fibers which emanate from at least one of both layers. These holding fibers penetrate the layer of active substances or particles individually or in clusters or tufts at locations densely distributed over the entire surface.

The invention is predicated upon the recognition that fine grain or fibrous solid active substances or particles—hereinafter sometimes simply generically referred to as active particles—can be obtained in a flat, flexible stratified body to be fully effective for the medium which is to be treated, if they are immobilized while retaining their free accessibility for the medium.

Now it has already been proposed in German Patent Publication No. 2,264,258 to agglomerate active granules by means of a binder upon fleece materials for filters. However, the binder covers part of the effective surface of the active granules and thereby reduces their specific effectivity. In the case of active substances formed, for instances, on a synthetic resin basis, damage can arise due to the effects of heat or by virtue of undesired reactions or interactions between the active substances and the binder, especially with the solvent or dispersion agent of such binder. The agglomerates are rigid and tend to crumble very easily when exposed to mechanical load.

With the stratified body according to the invention there is obtained an open fiber structure of the holding fibers through which both the outer and also the internal structure of the stratified body is freely accessible at all locations and in the same manner for the medium which is to be treated. Furthermore, the free accessibility is not hindered by any additional attachment or connection material, such as for instance a sewing thread or a binder. Consequently, the active particles are also freely accessible and all of the active particles can participate in an interaction with the medium to be treated over their entire circumference and in the same manner. By virtue of the holding fibers emanating from at least one of both layers, which holding fibers preferably constitute part of a fibrous material, the stratified body essentially has a uniform thickness. Hence, the individual layers are dispositioned essentially in parallelism and there does not prevail any constrictions or regions which are exposed to compression, for instance by virtue of a holder material applied externally to the stratified body and penetrating therethrough. The individual active particles are retained by the holding fibers, for instance in their desired position and surrounded thereby. Due to its structure, the stratified body produced according to the invention also is capable of being regenerated or cleaned, without loss of active particles, in a most simple manner, for instance by washing, beating or blowing-through or similar or equivalent treatments.

As to the known active substances or particles, there are preferably used such which can act upon a fluid medium, that is to say, a liquid or gaseous medium, which is present or circulates for instance between the more direct and the further surroundings of the active particles, by emission, sorption or catalysis. There can be used, for instance, particles which give off fertilizer or dung substances or protective substances for plant cultivation to throughpassing water. On the other hand, there also can be used adsorption agents or absorption agents, such as peat, activated charcoal, vermiculite, perlite, diatomaceous earth or the like as well as such substances impinged with known substances as carried material, especially in the form of grains, granulates, friable pieces, fibers, powder, flux or random mixtures and combinations thereof, for instance for binding smells, binding noxious substances from water or air or oil. The active substances or particles also can be present in the form of an ion exchanger, for instance for water softening or for a hydroculture, where they, for instance in a cushion or pad shape of the stratified body, eliminate the hardness of the water due to carbonates and release fertilizer salts. Finally, there can be employed catalysts for the most different purposes, for instance for dry gas cleaning, for the catalytic treatment of petroleum or the like. There also can be used active substances which emit gaseous substances to the surrounding air, for instance, dispense an odorous substance, dispense bacteria killing substances or those which produce radiation protection by absorption of radiation.

The active substance is preferably in the form of a powder or granulate, or, for instance, bound to a powder or granulate, whereby the effective surface for the active substances can be conversely increased with the grain size. A difficulty exists in appropriately immobilizing such granular active substances. For different reasons there is desired a conditioning in a flat shape. Since in the case of, for instance, the sorption or emission of chemical substances there are effective, in the first instance, the material particles which are located at the surface, there is uneconomical, for instance, strewing into bowl-like containers and the like. This is especially true in the case of media which flow past the surface. In the case of, for instance, throughflowing media (liquids, gases) there is, on the other hand, increased the resistance as a function of the layer thickness. In the case of extremely fine grain active substances there occurs a clogging of the flow channels due to the flow pressure and by virtue of deposition of contaminants. In the case of media which, for instance, wipingly move over the surface, the loosely strewn grains are carried away by the flow, especially then, as is oftentimes the case, if the granules of the active substance have a very low specific weight.

A further reason for processing active substances in flat shape is the possibility, for instance, of dividing the obtained areal or flat structure into portions. The aeral structures thus can be fabricated in an inexpensive manner in a web shape during a continuous working process. It is also then possible to form by stratification three-dimensional treatment bodies, and the possibility exists of combining areal or flat structures having different functions. Thus, for instance, there can be formed a first layer for the removal of noxious substances, for instance hardness formers or for the regulation of the pH-value, a second layer for giving-off active substances for plants and so forth. In order to filter liquids and gases the flat or areal shape is particularly advantageous. The stratified body of the invention can be furthermore used in an advantageous manner, while employing appropriate active substances for particles, also as a face mask in the cosmetic industry, as plant package or as fango or mud pack.

The stratified body according to the invention affords a simple and economical solution for the initially mentioned problems. Apart from the previously mentioned advantages which are inherent for the areal or flat shape, it has still further advantages. The laminated body is preferably formed of flexible elements and the interconnection between the substratum layer and the top or cover layer by means of the holding fibers can be carried out extremely pliably. Therefore, the stratified body can be rolled, and thus, also easily transported. It can be readily accommodated for instance to a given, non-flat substrate or base. A further advantage resides in the loosening of the layer of active substances by the holding fibers. These holding fibers prevent lateral shifting of the active particles, so that there is not altered the original surface-like distribution of the particles, for instance, due to repeated rolling and unrolling, or due to the shape imparted to the stratified body. The holding fibers preferably also prevent the caking together of the active particles due to wetting or heating by the throughflowing fluid medium and enable, for instance, a desired turbulence of the particles and the medium which for instance comes into contact therewith. The holding fibers, particularly when in a cluster-like or tuft arrangement also have a capillary effect. This can be further influenced by suitable selection of the fiber material in relation to the fluid medium which is to be treated. Thus, for instance, in the case of aqueous liquids, there can be employed fibers having hydrophilic surface properties, and in the case of oily liquids, fibers having hydrophobic surface properties. The effectiveness of the active particles or substances is also further increased in that, with the stratified body according to the invention, the fluid medium can flow around approximately each individual particle. As the hydrophilic fiber material there are well known to the art materials formed on the basis of cellulose. Hydrophobic properties are possessed generally for instance by fibers formed of polyolefin plastics, for instance polypropylene.

Under the term "fine grain or fibrous solid active substances", as used in the sense of the disclosure of the invention, there should be understood such substances which preferably have such distribution of the particle size that the major or predominant part of the particles have a size between 0.01 and approximately 6 mm, preferably for instance between 0.01 and 2 mm, with a proportion of finer and, if desired, a proportion of coarser particles. Under the term "fibrous active substances" there are also to be understood such substances which can be obtained by comminution of natural materials or substances, such as leather, turf, tree bark and the like, as well as also foam plastics. The expression "fiber-containing top or cover layer" and "holding fibers" is intended to indicate that these constituents can consist of fibers having finite staple length or endless filaments which are not intertwined with one another or present in the form of twisted yarn.

The stratified body of the invention can be fabricated in an advantageous manner in that upon the substratum layer formed of a flexible, passive needle-punchable areal structure, there is deposited at least one layer formed of fine grain or fibrous solid active particles or substances and covered with the top or cover layer formed of a needle-punchable material. By means of fiber-orienting needles, the holding fibers are pulled out of the cover layer individually or in clusters at locations densely distributed over the entire surface, drawn through the layer or layers of active particles into the substratum layer which essentially holds back the active particles and, thus, the substratum layer and cover layer are interconnected with one another.

With the invention, it is also possible, by suitable selection of the nature and quantity of the fiber materials, the substratum and separation layer, the grain size of the active particles and so forth, as well as by controlling the process conditions, such as number of needle punctures per unit of area, penetration depth of the needles, in other words by a greater or lesser compaction of the fiber materials, by a more pronounced or weaker perforation of the substratum layers and so forth, to control within wide limits the speed of the emission, sorption, desorption, exchange and similar processes.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
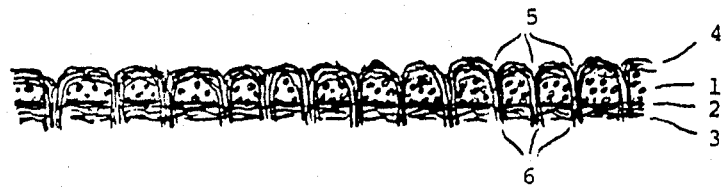
FIG. 1 schematically illustrates in sectional view a stratified body according to the invention.

Describing now the drawings, in the showing of the exemplary embodiment of stratified body or article of FIG. 1 the active grains or particles 1, in other words the active substance, are enclosed between a passive needle-workable or needle-punchable substratum layer 2, 3 which is essentially impervious for the active particles 1 and a fiber-containing cover or top layer 4. The substratum or base layer 2, 3 is held together with the particle layer 1 by holding fibers 6 which piercingly extend through the locations or places 5 which are densely distributed over the entire surface. The active grains or particles 1 can have a grain size which is in the order of about between 0.01 and 6 mm. The individual expressions which have been employed previously in this disclosure will be more fully explained hereinafter based upon the following comments with respect to an exemplary embodiment of the method of the invention. Yet, it is to be expressly understood and as will be apparent to those versed in the art, various modifications of the method are possible and contemplated within the scope of the invention.

Figure 2:
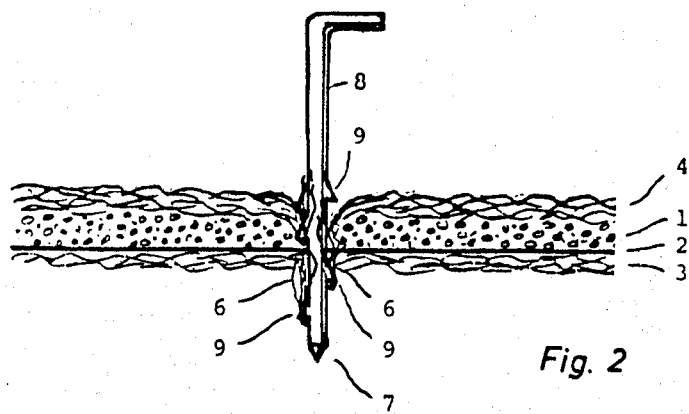
FIG. 2 illustrates the stratified body of FIG. 1 during an intermediate stage of its production.

FIG. 2 illustrates the stratification of the individual components during the mechanical processing of the material into the stratified body or article shown in sectional view in FIG. 1.

The active grains or particles 1 are deposited, with the desired surface distribution, upon the web-like substratum or base layer 2, 3, constituting a closed sheet-like areal structure, preferably in a layer of 1000 to 3000 g/m$^2$.

In the illustrated embodiment the substratum layer 2,3 is composed of a plastic foil 2 and a preferably pervious fiber composite or compact 3. Depending upon the nature of the active particles or grains 1 or upon the nature of the intended use of the product, one of both components 2 or 3 of the substratum layer 2, 3 can be omitted or interchanged in the sequence in which they are arranged. The substratum layer or base 2, 3 can also be constituted by a web or fleece, paper or cardboard.

Basically, the following conditions are placed upon the substratum or base layer 2,3: in the finished product it should essentially be impervious with respect to the active grains or particles 1. The permeability in relation to the fluid medium to be treated depends on the nature of the application, especially upon whether the fluid medium flows through the areal structure, that is to say, enters at the cover or top layer 4 and exits at the substratum layer 2,3, or whether it wipingly moves past the cover or top layer 4. A further condition is the passive needle-punchability or workability. Here there is to be merely understood that the substratum layer 2,3 can be punctured by needles, as the same are used for strengthening flat textile structures in the needle felting art, without large resistance and without appreciably damaging the substratum layer, and further, without the needles being exposed to any excessive wear. Additionally, the substratum layer 2, 3 should elastically fixedly retain the holding fibers 6 which individually or in clusters penetrate the substratum layer.

Deposited upon the layer of the active particles or grains 1 is a layer 4 of needle-punchable fibers. These needle-punchable fibers are engaged by downwardly directed barbs 9 arranged laterally of the shaft 8 of needle 7 which are used for instance during the fabrication of needle felt. The fibers which are thus engaged by the needle 7 during needle punching are deflected in a direction perpendicular to the plane of the surface of the layer 4. This requires a certain strength and pliability of the fibers, and in the case of fibers an adequate staple length, in the case of endless filaments, for instance a deposition in the form of loose loops or coils, so that such loops can be downwardly drawn by the barbs 9 without tearing the filaments. By way of example there is deposited a card-fiber fleece or web of 150 g/m² crimped polypropylene fibers having a staple length of 80 mm and a fiber titer of 15 dtex.

As is known from the needle felting art a multiplicity of needles 7 simultaneously carry out a needle puncturing operation and throughout a number of successive strokes, so that there results for instance a stitch density of 60 stitches per cm², from the side of the cover or top layer 4 into the material web. The barbs 9 of the needles 7, upon passage through the cover layer 4, tear along individual fibers or entire clusters of holding fibers 6 and partially orient them to a point past the substratum layer 2,3. Upon retraction of the needle 7 the holding fibers 6 are stripped off of the barbs 9. The holding fibers 6 then for the most part remain anchored over part of their length in the cover layer 4, whereas another part of the length of the same fibers is fixedly retained by the substratum or base layer 2,3. Owing to the multiplicity of needle stitches there are drawn-in such holding fibers 6 at numerous locations 5 distributed over the entire surface. Consequently, there are thus held together the substratum layer 2,3 and the cover or top layer 4. On the other hand, the layer of active grains or particles 1 has drawn therethrough numerous fibers 6, so that the grains or particles are prevented from any lateral shifting in the plane of the surface of the article. The particles 1 are embedded in a loosened form between the holding fibers 6. These holding fibers 6 thus accomplish a dual function: they hold together the layers of the stratified body and, if desired, accomplish loosening of the layer of the active particles. By virtue of the needle work there is also provided permeability of the substratum layer 2,3 with respect to the medium, something which possibly was not present in the original state.

The carrier foil, for instance formed of plastic, can be a solid surface structure in its starting condition, that is to say, can be originally devoid of perforations, even if the article later is to be employed such that a fluid medium should flow therethrough. As mentioned, the foil is perforated by the needle stitches. Since fibers are simultaneously drawn through the perforations the active particles or grains 1 cannot pass through such perforations. Further, it is possible to work with needles of different thickness. The finer, possibly smooth needles have the function of perforating the foil so as to be pervious, whereas the thicker needles are used to punch through fiber clusters into the substratum layer 2,3 for the flexible separation layer which is pervious to the medium. For instance with correspondingly denser fiber layer 3 there can be used instead of the solid surface plastic foil 2 a lattice foil or a grid foil such as for instance commercially available from the Swiss firm Xiro, located at CH-3185 Schmitten, Switzerland, under their registered trademark "XIRONET". There results an increased permeability, and with appropriate selection of the material, an increased strength. It is also possible to proceed in a manner such that initially a fiber layer 3 is needled at a pre-perforated plastic foil 2,3, for instance a grid foil or network, in accordance with the above-described principle of needle felting. The resultant substratum layer 2,3 thereafter is turned so that the protruding ends of the fiber clusters are directed upwards and then covered with a layer of active particles 1. These active particles 1 are prevented from laterally shifting away by the fiber clusters. Over the layer of active particles 1 there is then laid a fiber-containing cover or top layer 4 and thereafter needled together with the substratum layer 2,3.

Figure 3:
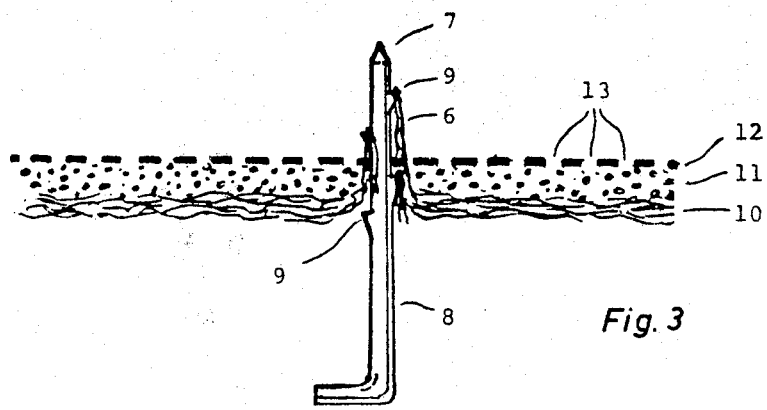
FIG. 3 illustrates in schematic sectional view another construction of stratified body during an intermediate stage of its production.

A simplification of the method which is suitable for many fields of applications resides in arranging the layers in the sequence shown in FIG. 3. Specifically, there is first laid a fiber-containing layer 10, thereafter there is deposited thereon a layer of active particles 11. Then there is laid a grid foil 12, whose throughpass openings 13 if desired can be larger than the grain size of the active particles 11. The stratified material is then needled upon a suitable needle device of a type well known in the needle felting art, the needle punctures being accomplished from below as indicated in FIG. 3. The original openings 13 which are pervious for the active particles 11 are extensively filled by the fiber clusters which are drawn-in by the needles, so that after turning the obtained product the active particles 11 cannot drop through the perforations of the grid foil, whereas there is ensured for the through-flow of the fluid medium which is to be treated.

Figure 4:
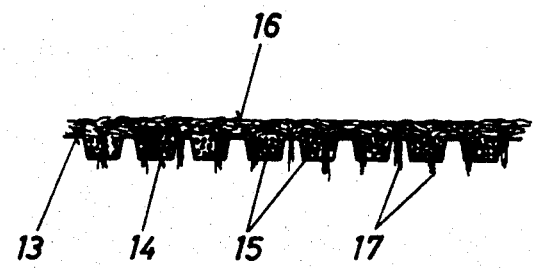
FIG. 4 illustrates in schematic sectional view a further embodiment of stratified body.

As furthermore shown in FIG. 4 a substratum or base layer 13, which for instance is formed of a plastic foil, a fiber composite or also a combination thereof, can contain cup-like protuberances or elements 14 which are filled with active particles 15. The protuberances 14 which are filled with the active particles 15, as previously described, are covered with a cover or top layer 16 and the entire structure is then needled from above, so that again holding fibers 17 emanating from the cover layer 16 are anchored into the substratum layer 13.

Instead of depositing the layer of active particles over the entire surface, the same also can be deposited only in a partial manner, for instance as a strip-shaped layer or in the form of individual fields or zones arranged in spaced relationship from one another.

Figure 5:
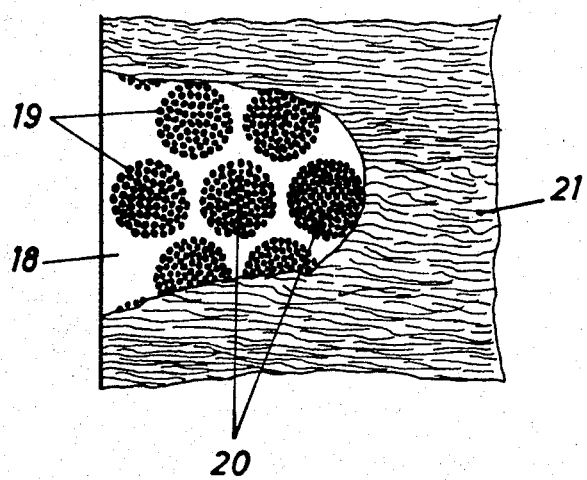
FIG. 5 illustrates a further embodiment of a stratified body in top plan view, partially broken away and in schematic illustration.

As best seen by referring to FIG. 5 there is applied to a substratum layer 18 a layer of active particles 19 in the form of individual, mutually spaced, substantially circular-shaped zones or fields 20 which are then covered with a cover or top layer 21. This cover or top layer 21 is then needled, as previously explained, with the substratum layer 18. In this way there can be produced at a web of the substratum layer a number of stratified bodies having predetermined external dimensions and, for instance, can be stamped-out or otherwise cut to size into, for instance, individual pieces from the web at the place of use or depending upon requirements and then can be put to use. There also can be provided other random geometric configurations of the zones or fields, for instance, there can be provided rectangular or triangular fields or regions of active particles, which then can be cut or stamped into appropriate individual pieces.

The substratum layer and/or the cover layer can also contain fibres which are capable of shrinking. After the needle work such fibers are exposed to a shrinkage treatment, so that following such needling, at least a part of the holding fibers are present in the form of shrunk fibers. In this way there can be obtained a compaction or, for instance, by activation of the shrinkable fibers, a stratified body having increased rigidity or stiffness and appearing in the form of a stiff plate. The stiffer laminated body can be employed for example instead of the heretofore known extremely complicated and rupture prone plates formed of activated carbon granulate or containing other suitable active particles, for instance without the need for any additional protective sheathing, as a throw-away article, for instance such can be used for removing odors from refrigerators or the like.

To bind oil on water there is known as a suitable active substance oil binding-peat. Dry peat of disintegration stages H1 to H4, according to the scale of von Post, is known as an outstanding absorption means due to its fibrous structure, apart from charcoal, perlite and the like, for instance for binding oil. Also in this connection the method of the invention affords the possibility of immobilizing such active particles in the form of an areal or surface-like, flexible stratified body or material, which active particles if simply deposited upon an oil contaminated water surface would be driven by the wind. In combination with the hydrophobic polypropylene fibers or with fiber material which has been rendered inherently hydrophobic, there results a stratified body which, even following the absorption of oil, is completely capable of floating. The hydrophobic fibers conduct the oil to the active particles by capillary action, whereas at the same time they are effective as a water barrier. It is also possible to produce a stratified body which is capable of sucking-up the fluid medium coming into contact therewith at both faces, such as for binding oil, by accomplishing the following procedures: there is laid as the substratum layer 3 a card-fiber fleece of 150 g/m² crimped polypropylene fibers, staple length 80 mm, fiber strength 15 dtex. Thereafter, there is deposited a layer of 2000 g/m² of a commercial oil binding-peat and on top thereof there is laid a cover layer 4 of the same composition as the substratum layer 3. The stratified or sandwiched body is then needled with a needle density of about 30 neat stitches per cm² and a stitching depth of 21 mm, then turned and again needled like before from the opposite side. The mat-shaped stratified body then can be used in a throughflow process for the separation of oil from water. It has been surprisingly found that the mutual penetration of the active particles (oil binding material) and fiber material has a synergistic effect. Specifically, the stratified body of the invention, in relation to the total weight, absorbs appreciably more foreign substances than the same total quantity of active particles alone. The active particles which are strewn between the holding fibers also prevent the closing of the capillary channels due to the parallel disposition of the fibers in a cluster or tuft.

While there are shown and described present preferred embodiments of the invention, it is to be distinctly understood that the invention is not limited thereto, but may be otherwise variously embodied and practiced within the scope of the following claims, accordingly,

What we claimed is:

1. An areal flexible stratified body for treating a liquid or gaseous medium coming into contact with the stratified body, comprising:
    a substratum layer comprising a flexible, passive needle-punchable plastic foil-like structure;
    a cover layer formed of a needle-punchable fibrous material and disposed upon the substratum layer;
    at least one layer formed of fine grain or fibrous solid active particles enclosed between the substratum layer and cover layer;
    said plastic substratum layer comprising said plastic foil-like structure possessing essentially cup-like protuberances filled with the active particles;
    holding fibers emanating from the cover layer;
    said holding fibers being anchored both at the substratum layer which essentially holds back the active particles and at the cover layer; and
    said holding fibers constituting part of the cover layer and part of the length of such holding fibers being needled through the layer of active particles into the plastic substratum layer and being elastically retained thereat.

2. The stratified body as defined in claim 1, wherein: the stratified body is pervious for a medium.

3. The stratified body as defined in claim 1, wherein: the layer of active particles are dispositioned in mutually spaced zones.

4. The stratified body as defined in claim 1, wherein: at least part of the holding fibers comprise shrunk fibers.

5. The stratified body as defined in claim 1, wherein: the active particles have a size in the order of about between 0.01 and 6 mm.

6. The stratified body as defined in claim 1, wherein: said active particles contain a substance capable of acting upon a fluid medium by interaction therewith; and
said substance being selected from the group consisting of adsorption substances, absorption substances, emission substances, ion exchange substances, and catalysts.

* * * * *